United States Patent
Ohira et al.

(10) Patent No.: US 10,210,414 B2
(45) Date of Patent: Feb. 19, 2019

(54) OBJECT DETECTION SYSTEM AND COMPUTER PROGRAM PRODUCT

(71) Applicant: KABUSHIKI KAISHA TOSHIBA, Tokyo (JP)

(72) Inventors: Hidetaka Ohira, Kanagawa (JP); Masahiro Sekine, Tokyo (JP); Masashi Nishiyama, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 45 days.

(21) Appl. No.: 13/915,979

(22) Filed: Jun. 12, 2013

(65) Prior Publication Data
US 2014/0064556 A1    Mar. 6, 2014

(30) Foreign Application Priority Data

Aug. 31, 2012   (JP) .................................. 2012-192409

(51) Int. Cl.
G06K 9/32       (2006.01)
G06K 9/00       (2006.01)

(52) U.S. Cl.
CPC ....... G06K 9/3241 (2013.01); G06K 9/00671 (2013.01); G06K 9/3275 (2013.01)

(58) Field of Classification Search
CPC .............. G06K 9/4642; G06K 9/6202; G06K 9/00456; G06K 9/4647; G06K 9/4604;
(Continued)

(56) References Cited

U.S. PATENT DOCUMENTS 6,047,893 A  *  4/2000  Saporetti ................. G06K 7/14
                                                       235/462.08
2010/0054611 A1* 3/2010  Nomura ............... G06K 9/6212
                                                         382/224
(Continued)

FOREIGN PATENT DOCUMENTS

JP     2010-020594     1/2010
JP     2010-271872    12/2010
(Continued)

OTHER PUBLICATIONS

Ohira et al., U.S. Appl. No. 13/676,640, filed Nov. 14, 2012.
(Continued)

Primary Examiner — Kenny A Cese
(74) Attorney, Agent, or Firm — Nixon & Vanderhye, P.C.

(57) ABSTRACT

According to an embodiment, an object detection system includes an obtaining unit, an estimating unit, a setting unit, a calculating unit, and a detecting unit. The obtaining unit is configured to obtain an image in which an object is captured. The estimating unit is configured to estimate a condition of the object. The setting unit is configured to set, in the image, a plurality of areas that have at least one of a relative positional relationship altered according to the condition and a shape altered according to the condition. The calculating unit is configured to calculate a feature value of an image covering the areas. The detecting unit is configured to compare the calculated feature value with a feature value of a predetermined registered object, and detect the registered object corresponding to the object.

18 Claims, 14 Drawing Sheets

(58) Field of Classification Search
CPC .. G06K 9/4671; G06K 9/3241; G06K 9/6212; G06K 9/00288; G06K 9/6267; G06K 2009/485; G06T 7/0083
See application file for complete search history.

(56) References Cited

U.S. PATENT DOCUMENTS

| | | | |
|---|---|---|---|
| 2010/0067742 A1* | 3/2010 | Ogawa | G06K 9/00369 382/103 |
| 2010/0287511 A1 | 11/2010 | Meier et al. | |
| 2010/0296706 A1 | 11/2010 | Kaneda et al. | |
| 2011/0013805 A1 | 1/2011 | Okada et al. | |
| 2011/0091113 A1* | 4/2011 | Ito | G06K 9/00248 382/197 |
| 2011/0158535 A1* | 6/2011 | Iio | G06K 9/4642 382/190 |
| 2011/0170780 A1 | 7/2011 | Vaddadi et al. | |
| 2011/0249867 A1* | 10/2011 | Haas | G06K 9/00818 382/103 |
| 2012/0155751 A1* | 6/2012 | Aoba | G06T 7/00 382/159 |
| 2013/0195367 A1 | 8/2013 | Ohira | |

FOREIGN PATENT DOCUMENTS

| | | |
|---|---|---|
| JP | 2010-541053 | 12/2010 |
| JP | 2011-061247 | 3/2011 |
| WO | 2011/007390 | 1/2011 |
| WO | 2011/085277 | 7/2011 |

OTHER PUBLICATIONS

Ohira et al., U.S. Appl. No. 13/676,640, filed Nov. 14, 2012—awaiting examination.
Office Action dated Jun. 17, 2014 in counterpart Japanese Patent Application No. 2012-192409 and English-language translation thereof.

* cited by examiner

FIG. 7
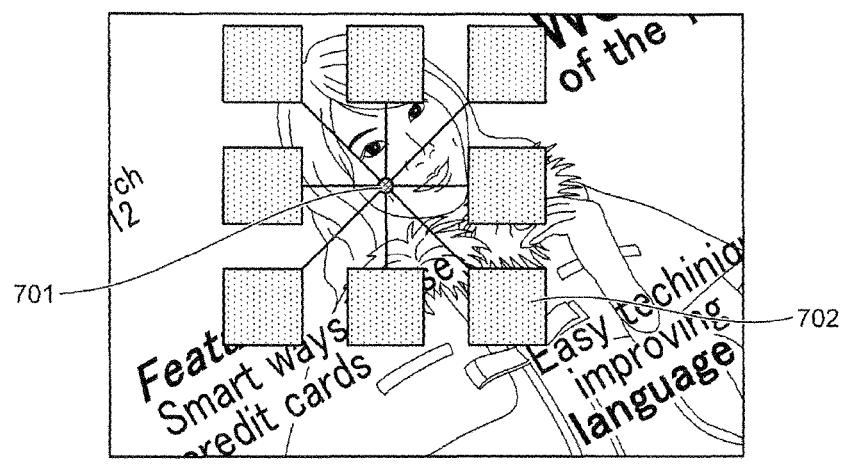
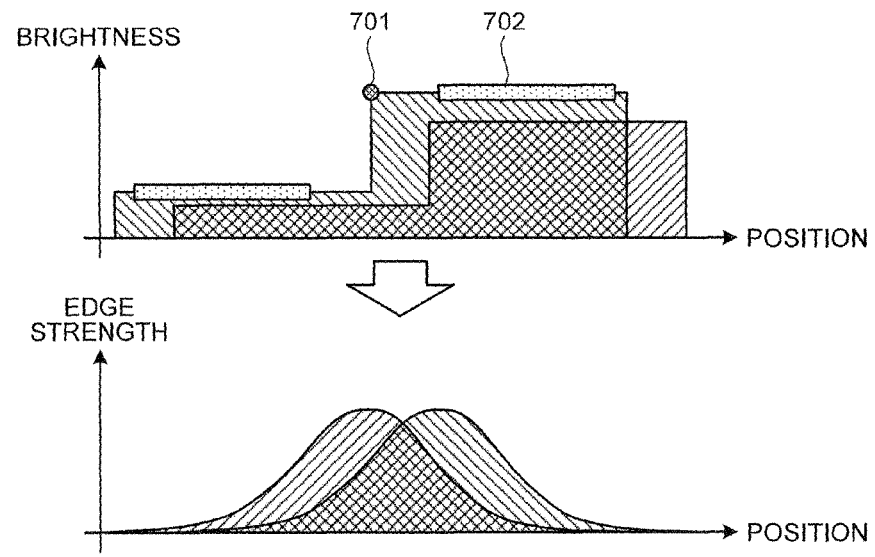

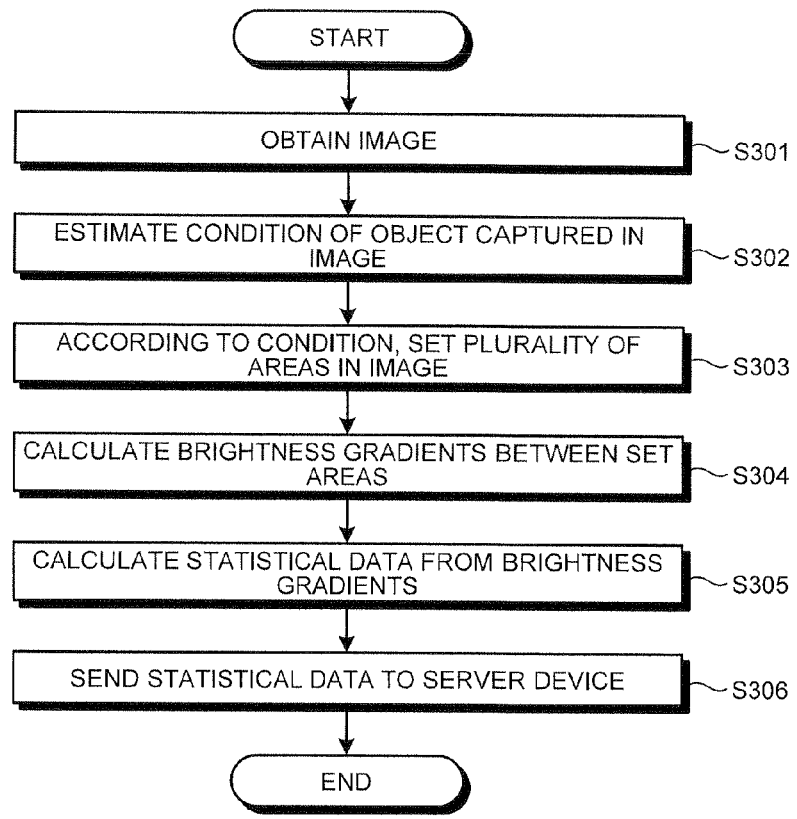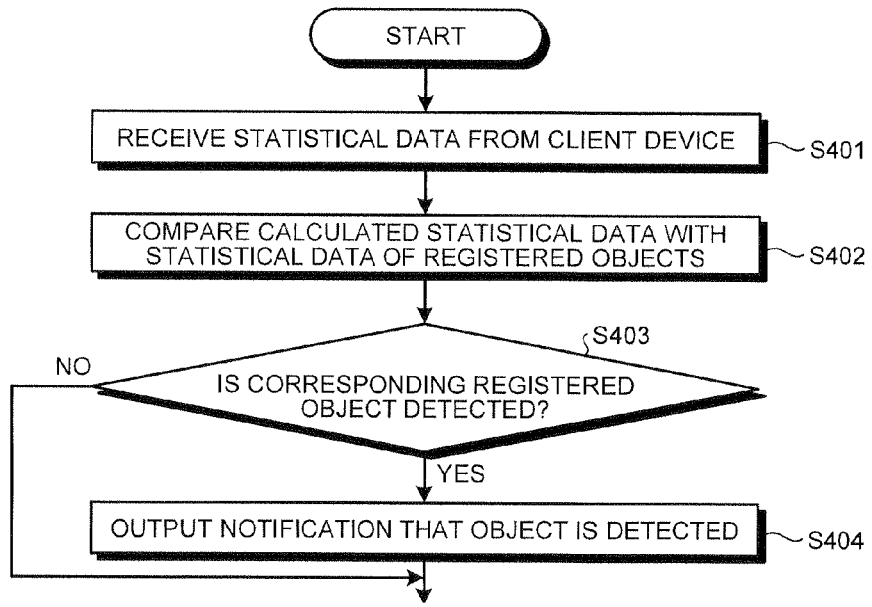

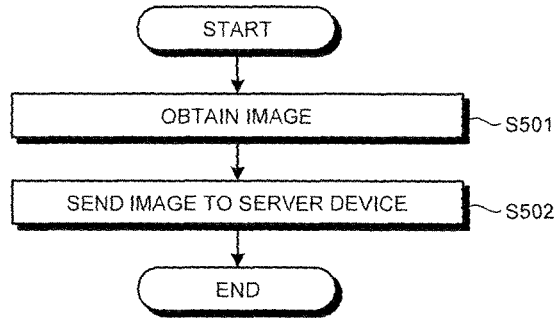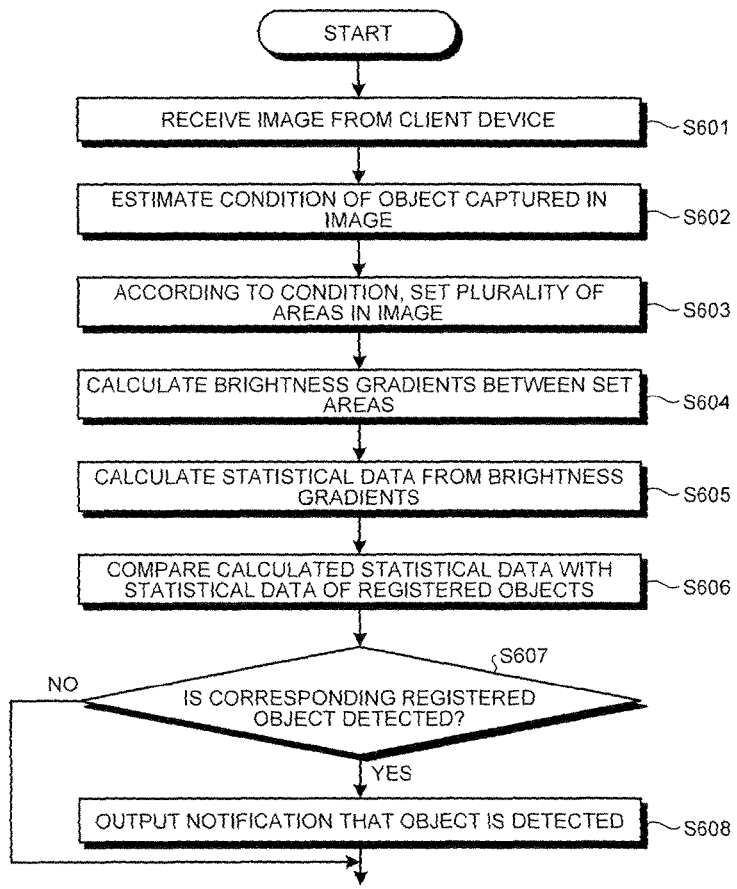

OBJECT DETECTION SYSTEM AND COMPUTER PROGRAM PRODUCT

CROSS-REFERENCE TO RELATED APPLICATION

This application is based upon and claims the benefit of priority from Japanese Patent Application No. 2012-192409, filed on Aug. 31, 2012; the entire contents of which are incorporated herein by reference.

FIELD

Embodiments described herein relate generally to an object detection system and a computer program product.

BACKGROUND

As a method of achieving augmented reality with the use of an image recognition technology, a method of using a marker is known. However, an inorganic marker undermines the design. In that regard, a technology is known in which no marker is used and an object is identified using a local feature value.

During image recognition used particularly for achieving augmented reality (for detection of objects from images), it is often the case that images captured in various realty environments are used. For that reason, there is a demand for an image recognition technology that is robust even against the changes in the environment.

BRIEF DESCRIPTION OF THE DRAWINGS

FIG. 7 is a diagram illustrating an example of setting areas and an example of extracting brightness gradients;

FIG. 12 is a flowchart for explaining a feature value calculation operation according to the third embodiment;

FIG. 13 is a flowchart for explaining a comparison operation according to the third embodiment;

FIG. 15 is a flowchart for explaining an image obtaining operation according to the fourth embodiment;

FIG. 16 is a flowchart for explaining a comparison operation according to the fourth embodiment;

DETAILED DESCRIPTION

Figure 1:
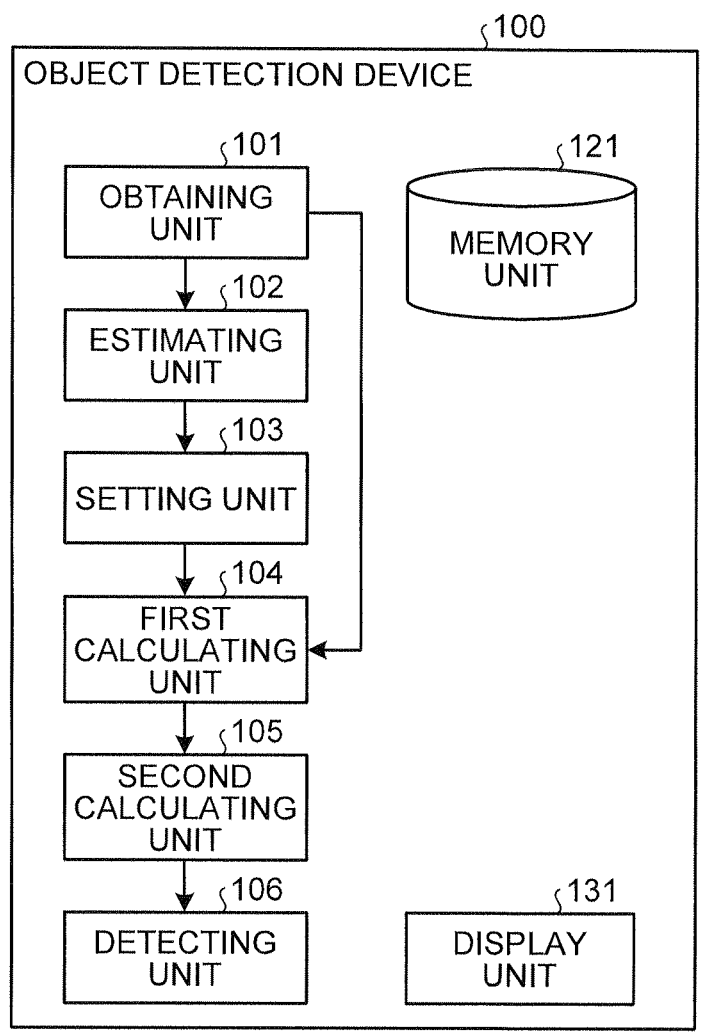
FIG. 1 is a block diagram of an object detection device according to a first embodiment.

According to an embodiment, an object detection system includes an obtaining unit, an estimating unit, a setting unit, a calculating unit, and a detecting unit. The obtaining unit is configured to obtain an image in which an object is captured. The estimating unit is configured to estimate a condition of the object. The setting unit is configured to set, in the image, a plurality of areas that have at least one of a relative positional relationship altered according to the condition and a shape altered according to the condition. The calculating unit is configured to calculate a feature value of an image covering each area. The detecting unit is configured to compare the calculated feature value with a feature value of a predetermined registered object, and detect the registered object corresponding to the object.

Exemplary embodiments of an object detection system according to the invention are described below in detail with reference to the accompanying drawings.

First Embodiment

While performing image recognition using a local feature value, in order to deal with the changes in the environment in which images are captured (i.e., in order to deal with the changes in the condition of an object); it is absolutely necessary to select the most suitable combination from a number of key points. However, that leads to an increase in the processing cost. Thus, an attempt to recognize a number of objects does not work out comfortably. It is also possible to think of a method of performing affine transformation of images according to the condition of an object. However, in that method too, the processing cost of affine transformation is high; and an attempt to recognize a number of objects does not work out comfortably. Moreover, due to information degradation and noise that results from affine transformation, there occurs a decline in the recognition performance.

In an object detection system according to a first embodiment, edges (brightness gradients) are calculated as the feature value from the areas peripheral to the sampling points in an image. At that time, the settings for the sampling points and the peripheral areas are altered depending on the condition of the target body for detection (object). With that, the image recognition (the object detection) performed using the feature value becomes robust against the changes in the condition of the object. Moreover, during the edge calculation performed using the peripheral areas; each sampling point can extract a broad shape. Hence, even with a small number of sampling points, the shape of the entire object can be extracted. For that reason, feature value extraction can be performed with only a small number of memory references and a low processing cost. As a result, the object identification can be done with a quick response speed.

In the first embodiment, the explanation is given for an example in which the object detection system is implemented in the form of an object detection device that is a single device. For example, the object detection device can be a handheld terminal such as a tablet or a smartphone. However, the device configuration for implementing the object detection system is not limited to the abovementioned example. Alternatively, as described later, it is also possible to implement the object detection system by decentralizing the functions among a plurality of devices. Still alternatively, the configuration can be such that a plurality of devices is equipped with a single function.

FIG. 1 is a block diagram illustrating an exemplary configuration of an object detection device 100 according to the first embodiment. As illustrated in FIG. 1, the object detection device 100 includes a memory unit 121, a display unit 131, an obtaining unit 101, an estimating unit 102, a setting unit 103, a first calculating unit 104, a second calculating unit 105, and a detecting unit 106.

In the memory unit 121, information that enables identification of predetermined registered objects is stored in a corresponding manner with the feature values obtained from the images of the registered objects. The detecting unit 106 (described later) checks the feature values stored in the memory unit 121 against the feature value of an object obtained from a captured image, and detects the registered object corresponding to the object. Meanwhile, the memory unit 121 can be configured with any type of a commonly-used memory medium such as a hard disk drive (HDD), an optical disk, a memory card, and a random access memory (RAM).

The display unit 131 displays a variety of information, and can be implemented using a display device such as a liquid crystal display or a display having a touch-sensitive panel.

The obtaining unit 101 obtains images in which an object is captured. For example, if an imaging unit (such as a camera) is mounted in the object detection device 100, then the obtaining unit 101 can be configured to obtain images captured by the camera. Moreover, the obtaining unit 101 can also be configured to obtain images from an external device of the object detection device 100.

The estimating unit 102 estimates the condition of an object that is captured in an image. Herein, the object can be any type of body. For example, the object can be a magazine, a poster, a pamphlet, a picture, an article of clothing, or a human being. The condition of an object points to, for example, the relative positional relationship of that object with respect to the camera, or the extent of curvature of that object, or the lighting environment under which that object is present. The relative positional relationship of an object with respect to the camera includes, for example, the distance between the object and the camera, the orientation of the object with respect to the camera, and the relative angle (the roll, the pitch, or the yaw) of the object with respect to the camera.

As the method of estimating the condition of an object, the estimating unit 102 can implement any one of the conventionally-used methods. For example, the estimating unit 102 can extract the shape of the object from an image by means of Hough transform, and calculate the positional relationship (the distance, the orientation, the angle) between the extracted object and the camera as well as calculate the curvature of the object. Alternatively, the estimating unit 102 can obtain the shape of an object from an image by performing template matching with pre-registered shapes.

Figure 2:
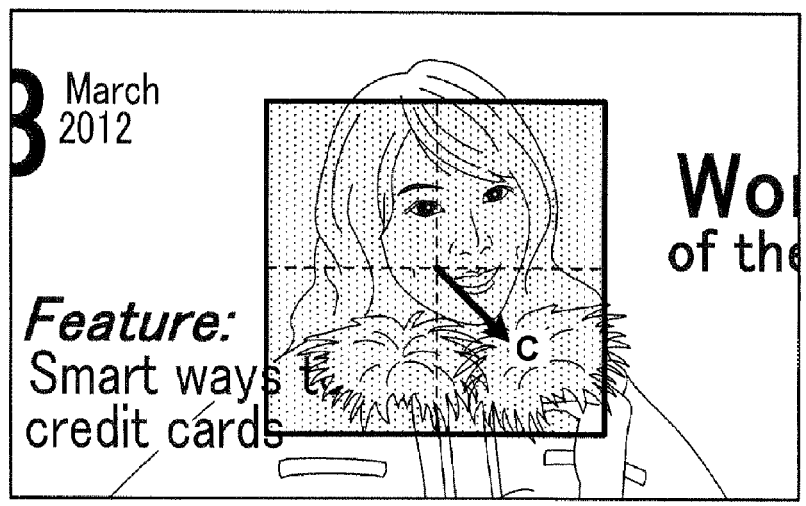
FIGS. 2 and 3 illustrate exemplary estimation methods implemented by an estimating unit.

As illustrated in FIG. 2, the estimating unit 102 can cut out a partial image from an image, calculate the vector from the center position of the partial image toward the position of the center of gravity of brightness, and estimate the relative angle of the object by making use of the direction of the calculated vector. For example, the estimating unit 102 can estimate the angle of the object from the angle difference between the vector that is calculated from the image of the corresponding registered object and the vector that is calculated from the captured image. The position of the center of gravity can either be calculated from all pixels within the partial image or be calculated from some of the pixels with the aim of reducing the processing cost. Moreover, it is possible to set a plurality of areas in the partial image and make use of those areas for the calculation of the center of gravity of brightness. For example, if $x_i$ represents the positions of n number of areas $S_i$ (i=1, 2, . . . , n) set in a partial image and if $y_i$ represents the total brightness value, then a center of gravity C can be expressed using Equation (1) given below.

$$C = \frac{\sum_i^n (x_i \cdot y_i)}{\sum_i^n y_i} \quad (1)$$

Figure 3:
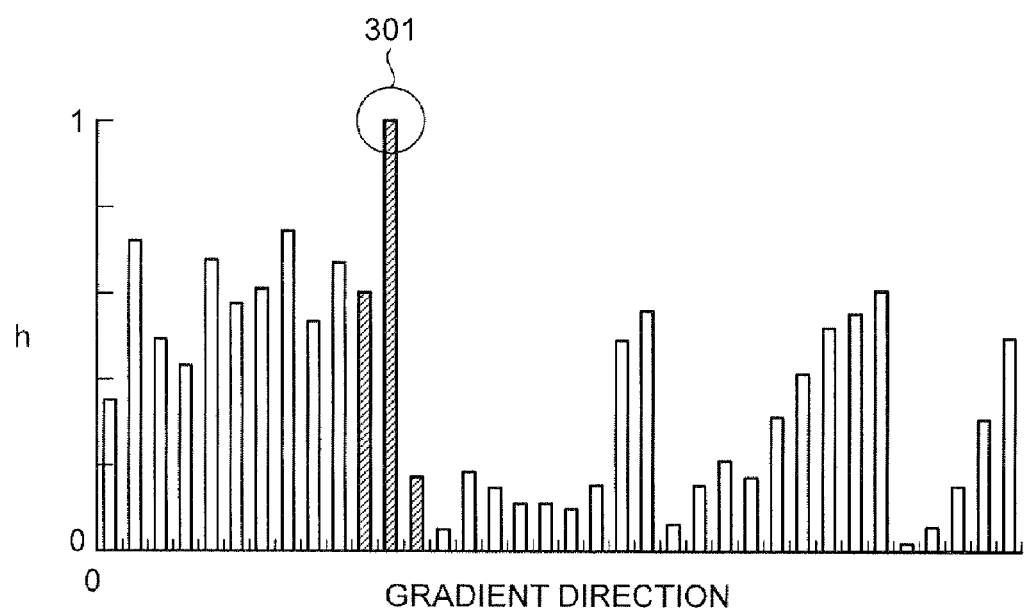

As illustrated in FIG. 3, the estimating unit 102 can estimate the relative angle of the object from the peak value of the statistics of brightness gradients extracted from the image. For example, the angle of the object can be estimated from the positional relationship between the peak value of the statistics of the image of the registered object and the peak value of the statistics of the captured image. Herein, the statistics can be calculated by setting a plurality of areas in an image and by making use of those areas, or by implementing a conventional brightness calculating method such as using the Histograms of Oriented Gradients (HOG) features. The peak value of the statistics can represent the position having the largest value or the position having the largest sum of the related statistics (for example, in FIG. 3, the location of a peak value 301 and the locations on the right and left of the peak value 301).

Alternatively, the estimating unit 102 can estimate the relative angle of the object also from the gradient direction of the partial image that is cut out from an image. For example, the estimating unit 102 can estimate the angle of the object from the angle difference between the gradient direction of the partial image that is cut out from the image of the registered object and the gradient direction of the partial image that is cut out from a captured image.

The estimating unit 102 can estimate the lighting environment of the object from the weighted sum of brightness of the image. For example, if the weighted sum is a small value, then the estimating unit 102 estimates that the object is present under a dark lighting environment. In contrast, if the weighted sum is a large value, then the estimating unit 102 estimates that the object is present under a bright lighting environment.

Meanwhile, the estimating unit 102 can also refer to the camera parameters such as the focal length, the numerical aperture, and the exposure time; and estimate the relative positional relationship of the object with respect to the camera and the lighting environment of the object.

When the object is present at a fixed position, the estimating unit 102 can estimate the relative positional relationship of the object with respect to the camera by referring to the position of the camera (i.e., the position of the object detection device 100), which is detected by a position detection function such as the global positioning system (GPS), and the fixed position.

In the case when the object detection device 100 includes a distance sensor, the estimating unit 102 can refer to the distance between the object and the camera that is obtained by the distance sensor, and estimate the relative positional relationship of the object with respect to the camera as well as estimate the curvature of the object. In the case when the object detection device 100 includes an acceleration sensor or a gyroscopic sensor, the estimating unit 102 can estimate the angle between the object and the camera by referring to the information obtained from the sensor. Moreover, the estimating unit 102 can estimate the lighting environment of the object by referring to the information on illumination intensity obtained from an illuminance sensor disposed in the object detection device 100 or from an illuminance sensor installed in the environment in which the object detection device 100 is kept.

The setting unit 103 sets, in an image, a plurality of sampling points and a plurality of areas (peripheral areas) for the purpose of calculating the feature value. At that time, according to the condition of the object, the setting unit 103 alters at least either the relative positional relationship of the areas or the shape of the areas. Moreover, according to the condition of the object, the setting unit 103 alters the positions of the sampling points, alters the spacing between the sampling points, and alters the directions of arranging the sampling points. Herein, the sampling points serve as reference points of the areas from which the feature value is extracted. Moreover, the areas serve as the range within the image from which brightness is extracted. The areas can have any arbitrary shape such as the rectangular shape or the circular shape.

For example, the setting unit 103 alters the relative positional relationship of the areas and alters the shape of the areas in such a way that the relative positional relationship of the object with respect to the camera matches with the relative positional relationship of the areas with respect to the entire image.

Given below is the explanation of an exemplary method implemented by the setting unit 103 for setting the areas and the sampling points.

If the object is present to the left of the camera, then the setting unit 103 places the sampling points on the left side. Similarly, if the object is present to the right of the camera, then the setting unit 103 places the sampling points on the right side.

If the object is present close to the camera, then the setting unit 103 sets the sampling points in a widely-spaced manner. On the other hand, if the object is present at a distant position from the camera, then the setting unit 103 sets the sampling points in a narrowly-spaced manner. If the shape of the object and the angle of the object with respect to the camera lead to the estimation that some portion of the object is present close to the camera and some portion of the object is present at a distant position from the camera, then the setting unit 103 sets a plurality of sampling points and sets the spacing between the sampling points in such a way that the position of each portion of the object matches with the distance between that portion and the camera.

If there is a change in the angle of the object with respect to the camera, then the setting unit 103 can alter the angle between the sampling points. For example, if the vertical direction of the object shifts by an angle α with respect to the vertical direction of the camera, then the estimating unit 103 sets the sampling points in such a way that the sampling points are arranged longitudinally in the direction of the angle α and are arranged transversely in the direction of the angle (α+90°).

The setting unit 103 sets the areas on the basis of the condition of the object and the positions of the sampling points. For example, if the object is present close to the camera, then the setting unit 103 sets large areas far from the sampling points. In contrast, if the object is present at a distant position from the camera, then the setting unit 103 sets small areas close to the sampling points.

If there is a change in the angle of depression (the roll or the pitch) between the object and the camera, then the setting unit 103 sets the rectangular width of the areas and the height of the areas according to the angle of depression. If there is a change in the angle of rotation (the yaw) between the object and the camera, then the setting unit 103 sets the positions of the areas with respect to the sampling points according to the angle of rotation.

If the object is present under a dark lighting environment; then, with the aim of enhancing the detection accuracy, the setting unit 103 narrows the spacing at least either between the areas or between the sampling points as compared to the case when the object is present under a bright lighting environment.

Figure 4:
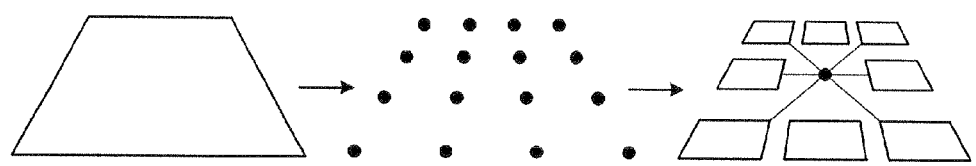
FIGS. 4 to 6 illustrate examples of setting areas and setting sampling points.
Figure 5:
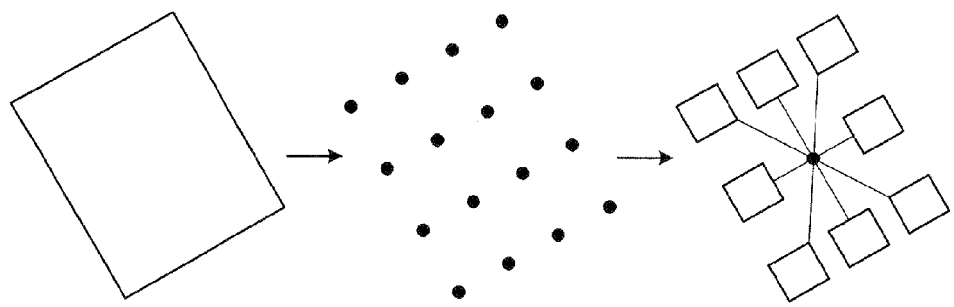
Figure 6:
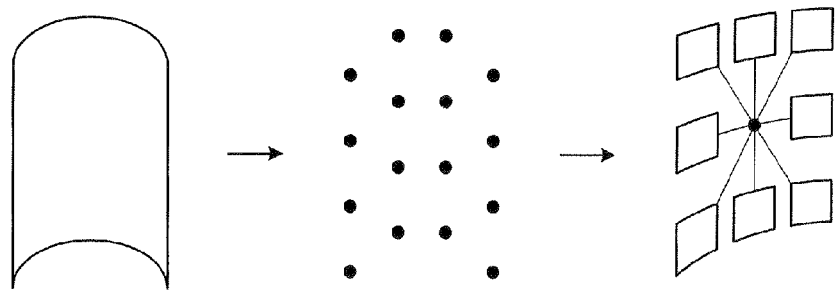

FIGS. 4 to 6 are diagrams illustrating examples of setting the areas and setting the sampling points. FIG. 4 illustrates a case when a rectangular object such as a magazine is leaning towards the depth direction when captured. Hence, in the image, the object becomes trapezoidal in shape. In such a case, the setting unit 103 sets the sampling points in a trapezoidal manner identical to the trapezoidal shape of the object captured in the image. Moreover, the setting unit 103 sets the sampling points in such a way that, closer the sampling points to the upper base of the trapezoid, the smaller is the spacing therebetween. Furthermore, as illustrated in FIG. 4, the setting unit 103 sets trapezoidal areas identical to the trapezoidal shape of the object.

Alternatively, instead of setting trapezoidal areas, it is also possible to set rectangular areas having the length of the sides altered according to the condition of the object. As described later, when the areas are rectangular in shape, the integral image can be used as the algorithm for calculating the average brightness. As a result, the calculation operation can be performed at a high speed.

FIG. 5 illustrates a case when there is a change in the angle of rotation (the yaw) between the object and the camera. In this case, in the image, the object becomes tilted by an angle (α). In such a case, the setting unit 103 sets the sampling points along the direction in which the object is tilted by the angle (α) in the image. Moreover, the setting unit 103 sets areas along the direction of the tilt angle (α).

FIG. 6 illustrates a case when the object has a curvature. In such a case, the setting unit 103 sets the sampling points along the curves identical to the curvature of the object. Moreover, the setting unit 103 sets curved areas along the curves identical to the curvature of the object.

By performing the operations described above, even when there is a change in the condition of the object, it becomes possible to calculate the feature value in a similar manner to calculating the pre-change feature value. As a result, object detection can be done in a more accurate manner.

Returning to the explanation with reference to FIG. 1, the first calculating unit 104 calculates the brightness gradients between the areas that have been set. The brightness gradients are calculated from the brightness values extracted from a plurality of areas corresponding to each sampling point. For example, a direction V(x) of the brightness gradients in the vertical direction and a direction H(x) of the brightness gradients in the horizontal direction, which are calculated from brightness values $L_x$ of n number of areas corresponding to the sampling point at a coordinate x, are expressed using Equation (2) and Equation (3) given below.

$$V(x) = \sum_{i}^{U_V(x)} a_i L_x(i) \tag{2}$$

$$H(x) = \sum_{i}^{U_H(x)} a_i L_x(i) \tag{3}$$

Herein, "$a_i$" represents the weight of an area i. "$U_V(x)$" represents the set of areas used at the time of calculating the brightness gradients in the vertical direction of the coordinate x. "$U_H(x)$" represents the set of areas used at the time of calculating the brightness gradients in the horizontal direction of the coordinate x. The brightness value of an area either points to the weighted sum of the brightness values of the pixels in that area or points to the weighted average of the brightness values of the pixels in that area. The weights of brightness values either can be fixed, or can be determined using the Gaussian filter, or can be set to arbitrary values. When an area is rectangular in shape, the brightness average can be calculated in a speedy manner by using the integral image.

In the examples illustrated in FIGS. 4 to 6, it is illustrated that eight areas are set on the periphery of the sampling points. In the case of making use of the brightness gradients between the areas, it is sufficient to set at least four areas. For example, the following four areas can be set: two areas arranged in the vertical direction for the purpose of calculating the brightness gradients in the vertical direction; and two areas arranged in the horizontal direction for the purpose of calculating the brightness gradients in the horizontal direction.

The second calculating unit 105 calculates the statistics of brightness gradients (calculates the statistical data). Herein, the statistical data points to the data obtained by quantifying the direction of brightness gradients and plotting a histogram. Herein, a direction $\theta(x)$ of the brightness gradients at the sampling point x is expressed using Equation (4) given below.

$$\theta(x) = \tan^{-1}\left(\frac{V(x)}{H(x)}\right) \quad (4)$$

The direction of brightness gradients can be discretized (quantized) to d-direction or to d-direction and no direction and then added to a histogram. The amount to be added to the histogram can be a fixed amount or can be in a weighted form. The value of the weight that is used for weighting can be an arbitrary value. For example, as the weight value, it is possible to use either the intensity of brightness gradients, or the variance of brightness values of the pixels in an area, or the output value of various sensors (the acceleration sensor and the gyroscopic sensor), or the value obtained by multiplying at least two of the abovementioned values.

Herein, an intensity $m(x)$ of brightness gradients at the sampling point x is expressed using Equation (5) given below.

$$m(x) = \sqrt{V(x)^2 + H(x)^2} \quad (5)$$

A histogram can be created using the brightness gradients extracted from some of the sampling points, or can be created using the brightness gradients extracted from all of the sampling points, or can be created by combining histograms each of which is created using the brightness gradients extracted from some of the sampling points.

The first calculating unit 104 and the second calculating unit 105 function as calculating units for calculating the feature value of the image in the areas that have been set. Herein, the feature value is not limited to the statistics of brightness gradients, and it is possible to use any of the feature values used conventionally.

For example, along with the brightness gradients, if the color feature value of the object is also added to the statistical data; it becomes possible to enhance the recognition accuracy. For example, the values of color difference signals of Cb or Cr can be added to the statistical data; or a histogram can be created using the gradients calculated from the values of color difference signals and then the histogram can be added to the statistical data.

Moreover, for example, the brightness of areas itself can be considered as the feature value. Alternatively, it is also possible to use BRIEF (binary robust independent elementary features) in which the feature is expressed in binary code. In that case, for example, the magnitude comparison result of the brightness values in a plurality of areas (e.g., the average of the brightness values in the areas) can be used as binary data. Alternatively, the magnitude comparison result of the brightness values of two areas, which are randomly selected from a plurality of areas, can also be used as binary data.

The detecting unit 106 compares the calculated statistical data with the feature value (the statistical data) of the registered objects stored in the memory unit 121; and, as the registered object corresponding to the object, identifies (detects) a registered object having the statistical data which resembles or matches the calculated statistical data. The statistical data of registered objects is calculated in advance by implementing the method identical to the method implemented by the first calculating unit 104 and the second calculating unit 105. The detecting unit 106 can calculate the degree of resemblance between two sets of statistical data by means of the sum of squared difference (SSD), or the sum of absolute difference (SAD), or the normalized cross-correlation. Moreover, in order to detect the registered object that corresponds to the object, the detecting unit 106 can be configured to make use of a discriminator such as the support vector machine (SVM).

FIG. 7 is a diagram illustrating an example of setting the areas and an example of extracting the brightness gradients. The setting unit 103 sets a sampling point 701 in an image. Moreover, with the sampling point 701 as the reference, the setting unit 103 sets areas 702 along the surrounding eight directions. As described above, in the first embodiment, the intensity of brightness gradients (edge strengths) are calculated from the brightness values of the surrounding areas 702. For that reason, as illustrated in the middle section in FIG. 7, even if there is a significant change in the brightness at the sampling point, the edge strength has an enhanced robustness against the change in the position (the change in the manner in which the object is seen).

Moreover, although not illustrated in FIG. 7, according to the condition of the object, the setting unit 103 alters the positions of the sampling points and alters the shape of the areas. With that, it becomes possible to achieve an enhanced robustness against the changes in the environment in which the image is captured. Furthermore, even if the number of sampling points is reduced, the shape of the entire object is extracted with robustness. By being able to reduce the number of sampling points; it becomes possible to, for example, reduce the number of memory references and increase the response speed.

Meanwhile, at the time of registering an object, aside from the image that gets registered, it is also possible to register an image in which image processing such as rotation or illumination variation is performed. With that, the changes in the manner in which the object is seen can be dealt with more robustness.

Figure 8:
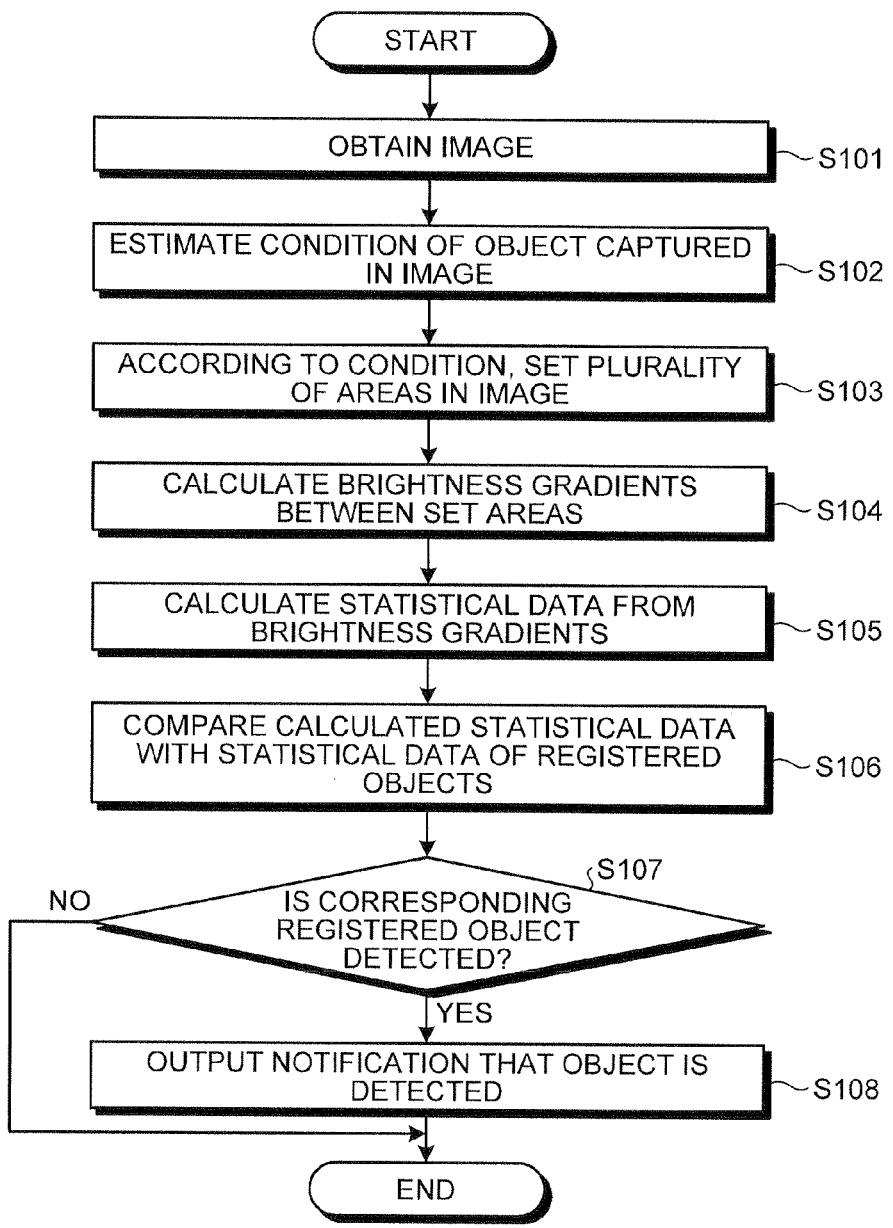
FIG. 8 is a flowchart for explaining an object detection operation according to the first embodiment.

Explained below with reference to FIG. 8 is an object detection operation performed by the object detection device 100 that is configured in the abovementioned manner according to the first embodiment. FIG. 8 is a flowchart for explaining an example of the object detection operation according to the first embodiment.

Firstly, the obtaining unit 101 obtains an image that is captured by, for example, a camera (Step S101). Then, the estimating unit 102 estimates the condition of an object that is captured in the obtained image (Step S102). Depending on the estimated condition, the setting unit 103 sets a plurality of sampling points and a plurality of areas in the obtained image (Step S103). Subsequently, the first calculating unit 104 calculates the brightness gradients between the areas that have been set (Step S104). Then, the second calculating unit 105 calculates the statistical data of brightness gradients using the brightness gradients that are calculated (Step S105). Subsequently, the detecting unit 106 compares the statistical data calculated from the image with the statistical data of registered objects stored in the memory unit 121 (Step S106). Then, the detecting unit 106 determines whether or not the corresponding registered object is detected, that is, determines whether or not a registered object having resembling or matching statistical data is detected (Step S107). If the corresponding registered object is detected (Yes at Step S107), then the detecting unit 106 outputs a notification that the object is detected (Step S108). That marks the end of the object detection operation. On the other hand, if the corresponding registered object is not detected (No at Step S107); then the detecting unit 106 ends the object detection operation.

The notification that the object is detected can be output to an external device via a communicating unit (not illustrated) or can be output (displayed) on the display unit 131. Moreover, according to the detection result, the detecting unit 106 can display contents on the display unit 131. For example, according to the detection result, the detecting unit 106 can stream a video or can display a homepage on the display unit 131. With that, it becomes possible to feed back a particular result to the user. In case it takes time to stream a video or to display a homepage, an animation indicating that the object is recognized (detected) can be displayed on the display unit 131. With that, it becomes possible to provide the user with an expeditious feedback about whether or not the object is recognized.

In this way, in the object detection system according to the first embodiment, the condition of a captured object is estimated; and areas for calculating the feature value, which is used in object detection, are set according to the estimated condition of the object. With that, it becomes possible to perform object detection that is robust against the changes in the condition of the object.

Second Embodiment

In an object detection system according to the second embodiment, not only the areas and the sampling points are altered according to the condition of the object but also the method of calculating the statistical data is altered according to the condition of the object.

Figure 9:
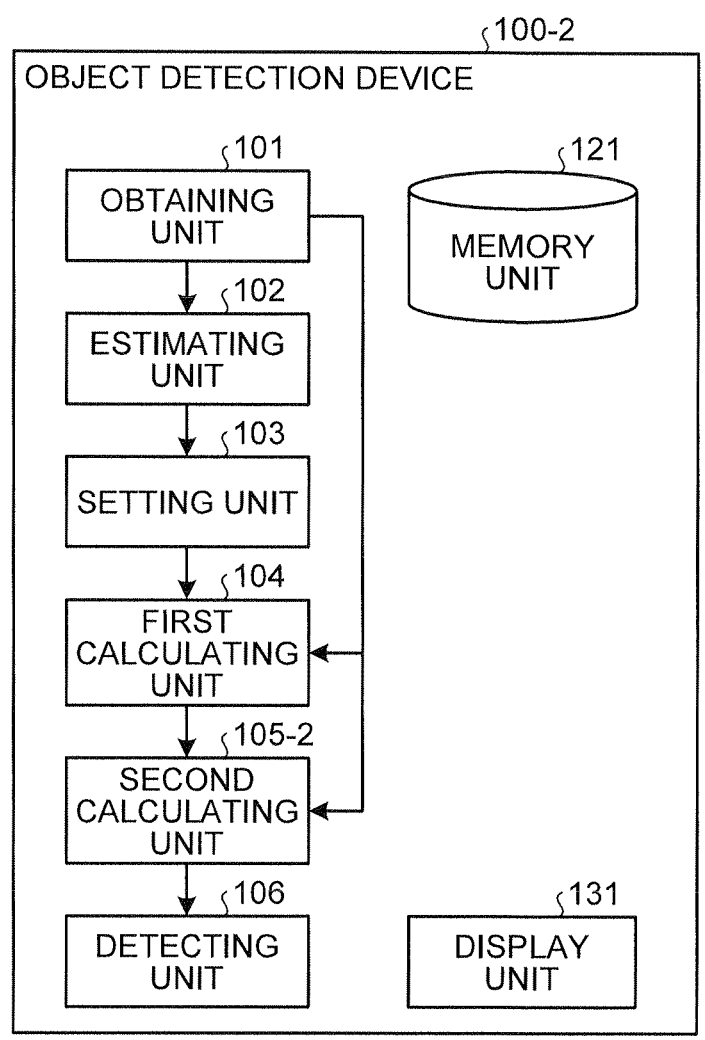
FIG. 9 is a block diagram of an object detection device according to a second embodiment.

FIG. 9 is a block diagram illustrating an exemplary configuration of an object detection device 100-2 according to the second embodiment. As illustrated in FIG. 9, the object detection device 100-2 includes the memory unit 121, the display unit 131, the obtaining unit 101, the estimating unit 102, the setting unit 103, the first calculating unit 104, a second calculating unit 105-2, and the detecting unit 106.

In the second embodiment, the second calculating unit 105-2 has different functions than the second calculating unit 105 according to the first embodiment. The other constituent elements and the functions thereof are identical to those illustrated in FIG. 1, which is the block diagram illustrating the configuration of the object detection device 100 according to the first embodiment. Those constituent elements are referred to by the same reference numerals and the explanation thereof is not repeated.

In addition to having the functions of the second calculating unit 105 according to the first embodiment, the second calculating unit 105-2 according to the second embodiment also has the function of altering the method of calculating the statistical data (for example, the method of creating a histogram) according to the condition of the object. With that, it becomes possible to achieve further enhancement in the recognition accuracy of objects.

For example, when there is a change in the angle of rotation of an object, the second calculating unit 105-2 alters the correspondence relationship between the directions of brightness gradients and the bins of the histogram according to the angle of rotation in such a way that the correspondence relationship between the directions of brightness gradients and the bins of the histogram matches with the statistical data of the registered object. When there is a change in the lighting environment of the object, the second calculating unit 105-2 alters the threshold value for determining no direction according to the lighting environment (for example, the lighting intensity). For example, under a dark lighting environment, the second calculating unit 105-2 reduces the threshold value for determining no direction. With that, for the purpose of object detection, it becomes possible to use only the highly accurate data having direction.

Figure 10:
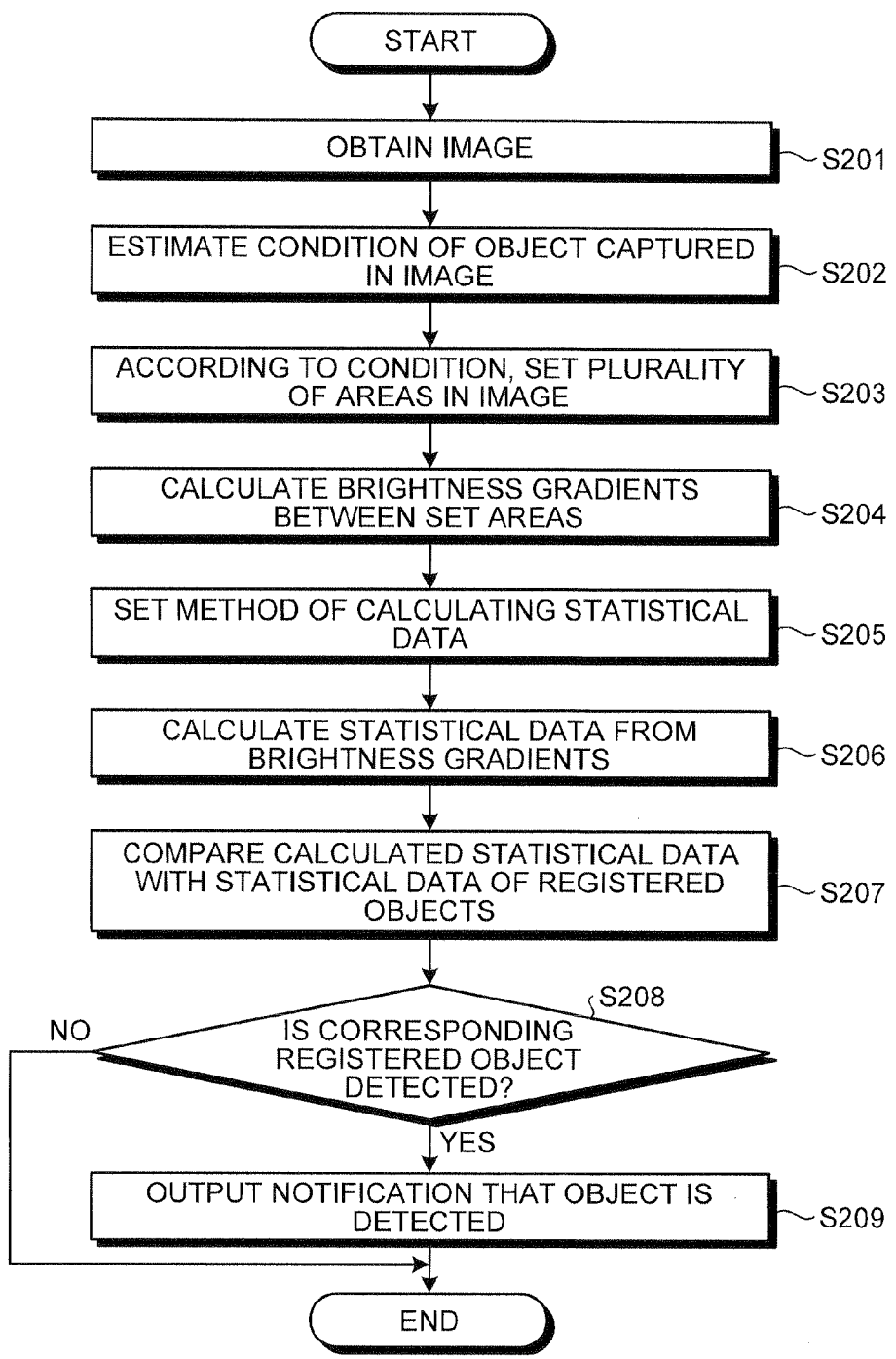
FIG. 10 is a flowchart for explaining an object detection operation according to the second embodiment.

Explained below with reference to FIG. 10 is an object detection operation performed by the object detection device 100-2 that is configured in the abovementioned manner according to the second embodiment. FIG. 10 is a flowchart for explaining an example of the object detection operation according to the second embodiment.

As compared to the object detection operation illustrated in FIG. 8 according to the first embodiment, the object detection operation according to the second embodiment differs in the way that the operation at Step S205 is additionally performed. Apart from that, the operations performed from Step S201 to Step S204 and the operations performed from Step S206 to Step S209 are identical to the operations performed from Step S101 to Step S108 illustrated in FIG. 8. Hence, the explanation of those operations is not repeated.

At Step S205, the second calculating unit 105-2 sets the method of calculating the statistical data according to the estimated condition (Step S205). For example, as described above, depending on the angle of the object with respect to the camera, the second calculating unit 105-2 alters the correspondence relationship between the directions of brightness gradients and the bins of the histogram.

In this way, in the object detection system according to the second embodiment, the method of calculating the statistical data is also altered according to the condition of the object. With that, it becomes possible to perform object detection that is robust against the changes in the condition of the object.

Third Embodiment

According to a third embodiment, an object detection system is configured by decentralizing the functions among a plurality of devices. More particularly, in the third embodiment, the explanation is given for an example in which the operations up to calculating the feature value (the statistical data) are performed in one device (in a client device) and the operation of detecting an object using the feature value is performed in another device (in a server device).

Figure 11:
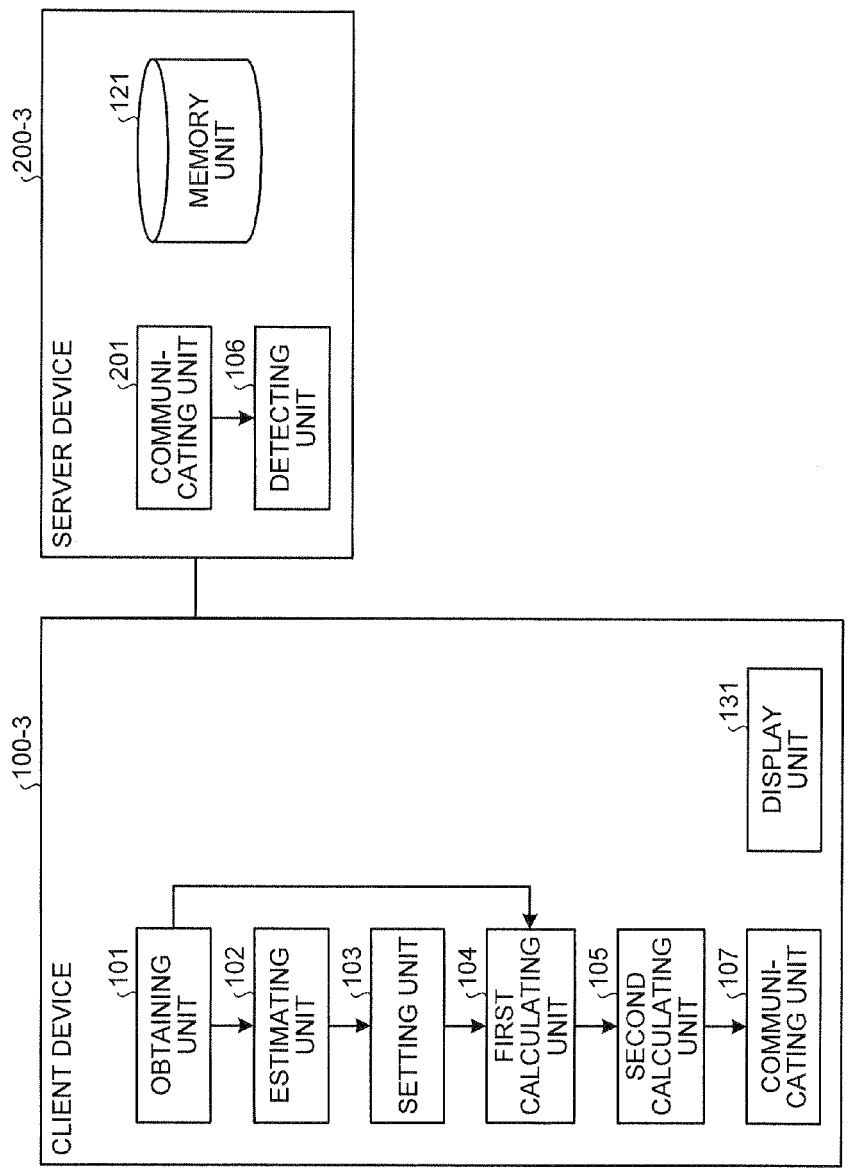
FIG. 11 is a block diagram of an object detection system according to a third embodiment.

FIG. 11 is a block diagram illustrating an exemplary configuration of the object detection system according to the third embodiment. As illustrated in FIG. 11, the object detection system according to the third embodiment includes a client device 100-3 and a server device 200-3. The client device 100-3 includes the display unit 131, the obtaining unit 101, the estimating unit 102, the setting unit 103, the first calculating unit 104, the second calculating unit 105, and a communicating unit 107. The server device 200-3 includes a communicating unit 201, the detecting unit 106, and the memory unit 121.

In this way, in the third embodiment, from among the functions of the object detection device 100 according to the first embodiment; the display unit 131, the obtaining unit 101, the estimating unit 102, the setting unit 103, the first calculating unit 104, and the second calculating unit 105 are provided in the client device 100-3. However, the detecting unit 106 and the memory unit 121 are provided in the server device 200-3. Moreover, the client device 100-3 and the server device 200-3 respectively include the communicating unit 107 and the communicating unit 201 that are used in communicating data between the two devices. Meanwhile, the constituent elements identical to those described in the first embodiment are referred to by the same reference numerals and the explanation thereof is not repeated.

The communicating unit 107 communicates data with an external device such as the server device 200-3. For example, the communicating unit 107 sends the feature data (the statistical data), which is calculated by the second calculating unit 105, to the server device 200-3.

The communicating unit 201 communicates data with an external device such as the client device 100-3. For example, the communicating unit 201 receives the feature value from the client device 100-3. Then, the detecting unit 106 makes use of the received feature value during the object detection operation.

Explained below with reference to FIGS. 12 and 13 is an object detection operation performed in the object detection system that is configured in the abovementioned manner according to the third embodiment. The object detection operation according to the third embodiment is divided into a feature value calculation operation (FIG. 12) that is performed in the client device 100-3 and a comparison operation (FIG. 13) that is performed in the server device 200-3.

FIG. 12 is a flowchart for explaining an overall sequence of operations performed during the feature value calculation operation according to the third embodiment. The operations performed from Step S301 to Step S305 are identical to the operations performed from Step S101 to Step S105 during the object detection operation (FIG. 8) according to the first embodiment. Hence, the explanation of those operations is not repeated. Once the statistical data is calculated at Step S305, the communicating unit 107 sends the calculated statistical data to the server device 200-3 (Step S306). That marks the end of the feature value calculation operation.

FIG. 13 is a flowchart for explaining an overall sequence of operations performed during the comparison operation according to the third embodiment. The communicating unit 201 of the server device 200-3 receives the statistical data from the client device 100-3 (Step S401). Then, the operations performed from Step S402 to Step S404 are identical to the operations performed from Step S106 to Step S108 during the object detection operation (FIG. 8) according to the first embodiment. Hence, the explanation of those operations is not repeated. Meanwhile, alternatively, the configuration can be such that, at Step S404, the detecting unit 106 outputs (sends) the detection result to the client device 100-3 via the communicating unit 201.

In this way, in the object detection system according to the third embodiment, a plurality of functions used during the object detection operation is decentralized among two devices. Thus, for example, it becomes possible to identify (detect) the object in a server having a high computational performance. As a result, even if there are a large number of registered objects, the calculation can be performed at a high speed.

Moreover, in the third embodiment, the explanation is given for an example in which the functions of the object detection device 100 according to the first embodiment are decentralized among two devices (a client device and a server device). Alternatively, the functions of the object detection device 100-2 according to the second embodiment can also be decentralized among two devices (a client device and a server device). In that case, for example, in place of including the second calculating unit 105 according to the third embodiment, the client device 100-3 can include the second calculating unit 105-2.

Fourth Embodiment

In a fourth embodiment, the explanation is given for another example of an object detection system that is configured by decentralizing the functions among a plurality of devices. More particularly, in the fourth embodiment, the operations up to obtaining an image are performed in one device (in a client device) and the operations starting from estimating the condition of an object are performed in another device (in a server device).

Figure 14:
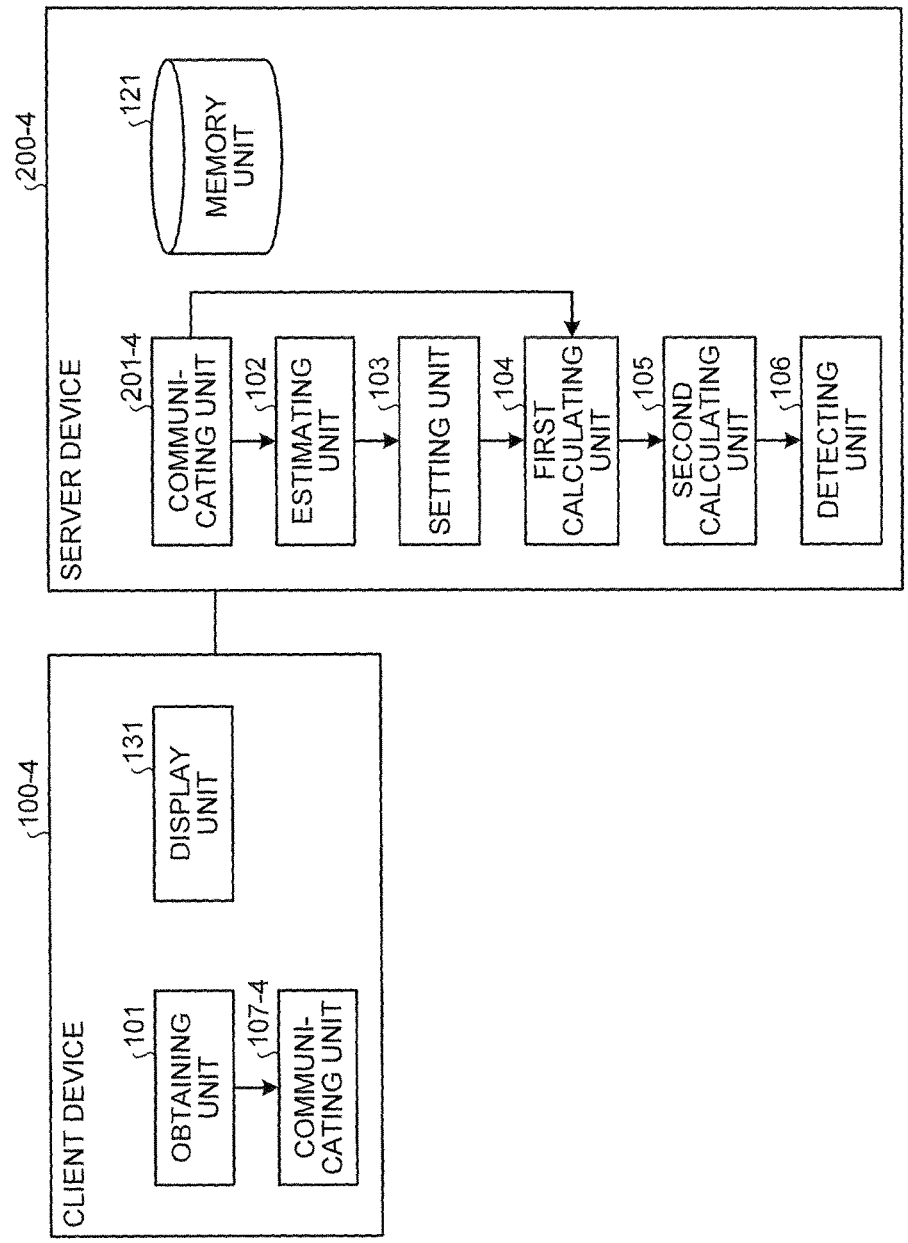
FIG. 14 is a block diagram of an object detection system according to a fourth embodiment.

FIG. 14 is a block diagram illustrating an exemplary configuration of the object detection system according to the fourth embodiment. As illustrated in FIG. 14, the object detection system according to the fourth embodiment includes a client device 100-4 and a server device 200-4. The client device 100-4 includes the display unit 131, the obtaining unit 101, and a communicating unit 107-4. The server device 200-4 includes a communicating unit 201-4, the estimating unit 102, the setting unit 103, the first calculating unit 104, the second calculating unit 105, the detecting unit 106, and the memory unit 121.

In this way, in the fourth embodiment, from among the functions of the object detection device 100 according to the first embodiment; the display unit 131 and the obtaining unit 101 are provided in the client device 100-4. However, the estimating unit 102, the setting unit 103, the first calculating unit 104, the second calculating unit 105, the detecting unit 106, and the memory unit 121 are provided in the server device 200-4. Moreover, the client device 100-4 and the server device 200-4 respectively include the communicating unit 107-4 and the communicating unit 201-4 that are used in communicating data between the two devices. Meanwhile, the constituent elements identical to those described in the first embodiment are referred to by the same reference numerals and the explanation thereof is not repeated.

The communicating unit 107-4 communicates data with an external device such as the server device 200-4. For example, the communicating unit 107-4 sends the image, which is obtained by the obtaining unit 101, to the server device 200-4.

The communicating unit 201-4 communicates data with an external device such as the client device 100-4. For example, the communicating unit 201-4 receives the image from the client device 100-4. Then, for example, the received image is used by the estimating unit 102 during the estimation operation and is used by the first calculating unit 104 during the calculation operation.

Explained below with reference to FIGS. 15 and 16 is an object detection operation performed in the object detection system that is configured in the abovementioned manner according to the fourth embodiment. The object detection operation according to the fourth embodiment is divided into an image obtaining operation (FIG. 15) that is performed in the client device 100-4 and a comparison operation (FIG. 16) that is performed in the server device 200-4.

FIG. 15 is a flowchart for explaining an overall sequence of operations performed during the image obtaining operation according to the fourth embodiment. The operation performed at Step S501 is identical to the operation performed at Step S101 during the object detection operation (FIG. 8) according to the first embodiment. Hence, the explanation of that operation is not repeated. Once the image is obtained at Step S501, the communicating unit 107-4 sends the obtained image to the server device 200-4 (Step S502). That marks the end of the image obtaining operation.

FIG. 16 is a flowchart for explaining an overall sequence of operations performed during the comparison operation according to the fourth embodiment. The communicating unit 201-4 of the server device 200-4 receives the image from the client device 100-4 (Step S601). Then, the operations performed from Step S602 to Step S608 are identical to the operations performed from Step S102 to Step S108 during the object detection operation (FIG. 8) according to the first embodiment. Hence, the explanation of those operations is not repeated. Meanwhile, alternatively, the configuration can be such that, at Step S608, the detecting unit 106 outputs (sends) the detection result to the client device 100-4 via the communicating unit 201-4.

Meanwhile, in the fourth embodiment, the explanation is given for an example in which the functions of the object detection device 100 according to the first embodiment are decentralized among two devices (a client device and a server device). Alternatively, the functions of the object detection device 100-2 according to the second embodiment can also be decentralized among two devices (a client device and a server device). In that case, for example, in place of including the second calculating unit 105 according to the fourth embodiment, the server device 200-4 can include the second calculating unit 105-2.

Fifth Embodiment

In an object detection system according to a fifth embodiment, only the method of calculating the statistical data is altered according to the condition of the object.

Figure 17:
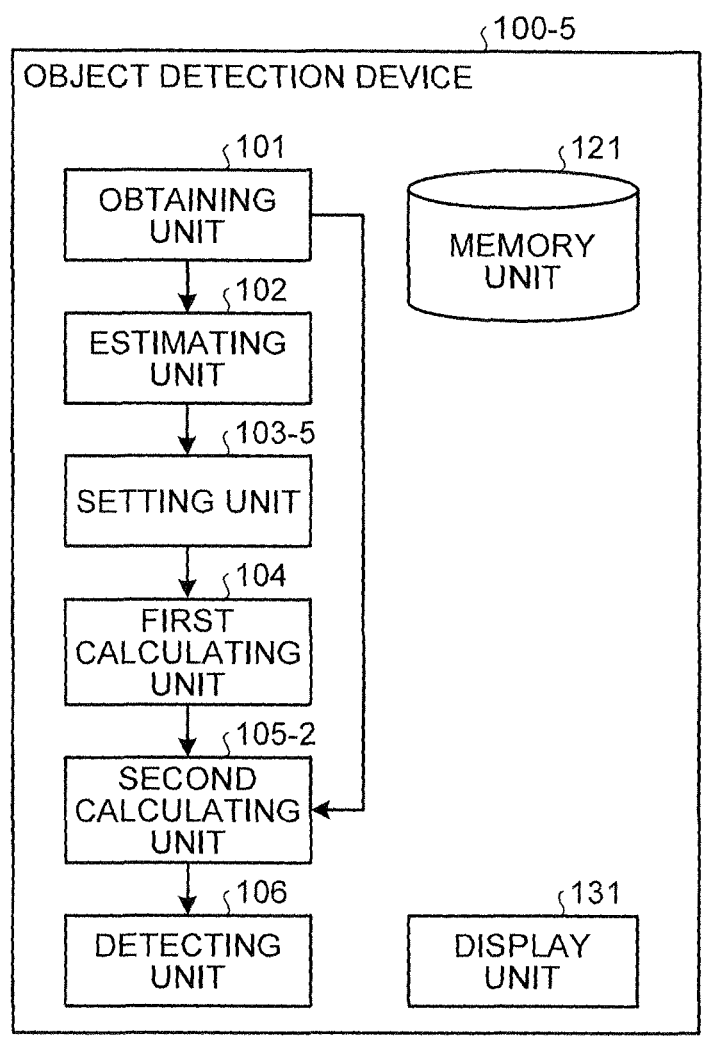
FIG. 17 is a block diagram of an object detection device according to a fifth embodiment.

FIG. 17 is a block diagram illustrating an exemplary configuration of an object detection device 100-5 according to the fifth embodiment. As illustrated in FIG. 17, the object detection device 100-5 includes the memory unit 121, the display unit 131, the obtaining unit 101, the estimating unit 102, a setting unit 103-5, the first calculating unit 104, the second calculating unit 105-2, and the detecting unit 106.

In the fifth embodiment, the setting unit 103-5 and the second calculating unit 105-2 have different functions than the setting unit 103 and the second calculating unit 105, respectively, according to the first embodiment. The other constituent elements and the functions thereof are identical to those illustrated in FIG. 1, which is the block diagram illustrating the configuration of the object detection device 100 according to the first embodiment. Those constituent elements are referred to by the same reference numerals and the explanation thereof is not repeated. Moreover, since the second calculating unit 105-2 has the same function as described in the second embodiment, the explanation thereof is not repeated.

The setting unit 103-5 sets, in an image, a plurality of sampling points and a plurality of areas (peripheral areas) for the purpose of calculating the feature value. In the fifth embodiment, the sampling points and the areas are not altered according to the condition of the object. For example, the setting unit 103-5 sets the sampling points at a predetermined spacing therebetween and sets the areas having a predetermined shape at a predetermined spacing on the periphery of the sampling points.

In the fifth embodiment, the second calculating unit 105-2 alters the method of calculating the statistical data according to the condition of the object. With that, it becomes possible to perform the object detection operation that is more robust against the changes in the environment in which the images are captured.

Figure 18:
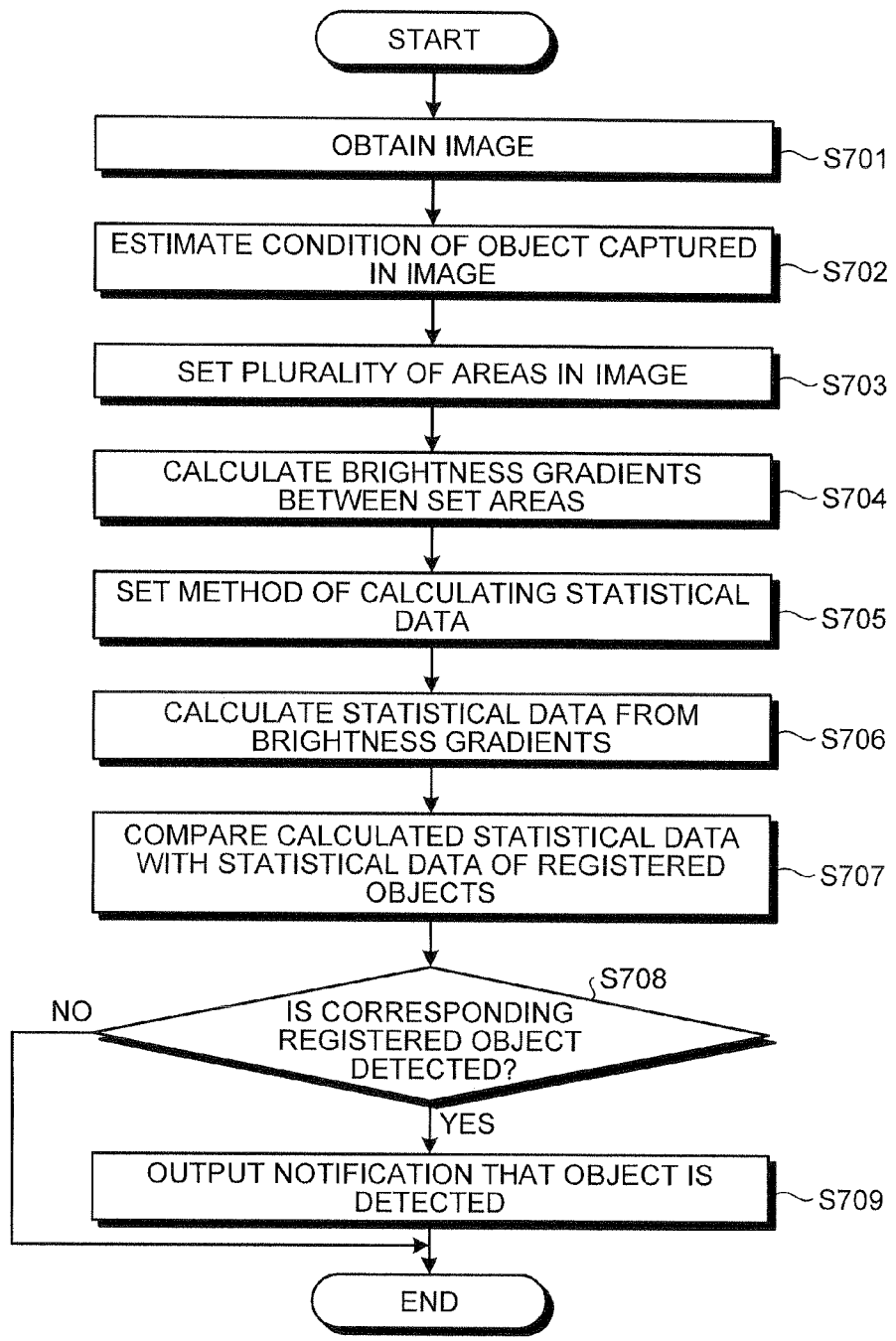
FIG. 18 is a flowchart for explaining an object detection operation according to the fifth embodiment.

Explained below with reference to FIG. 18 is an object detection operation performed by the object detection device 100-5 that is configured in the abovementioned manner according to the fifth embodiment. FIG. 18 is a flowchart for explaining an overall sequence of operations performed during the object detection operation according to the fifth embodiment.

The operations performed at Step S701 and Step S702 are identical to the operations performed at Step S101 and Step S102 illustrated in FIG. 8. Hence, the explanation of those operations is not repeated.

Then, the setting unit 103-5 sets a plurality of areas in the image (Step S703). As described above, the setting unit 103-5 according to the fifth embodiment does not alter the settings of the areas according to the condition of the object.

The subsequent operation performed at Step S704 is identical to the operation performed at Step S104 illustrated in FIG. 8. Hence, the explanation of that operation is not repeated.

Then, according to the estimated condition, the second calculating unit 105-2 sets the method of calculating the statistical data (Step S705). This operation is identical to, for example, the operation performed at Step S205 during the object detection operation (FIG. 10) according to the second embodiment.

The subsequent operations performed from Step S706 to Step S709 are identical to the operations performed from Step S105 to Step S108 illustrated in FIG. 8. Hence, the explanation of those operations is not repeated.

In this way, in the object detection system according to the fifth embodiment, the method of calculating the statistical data is altered according to the condition of the object. With that, it becomes possible to perform object detection that is robust against the changes in the condition of the object.

Figure 19:
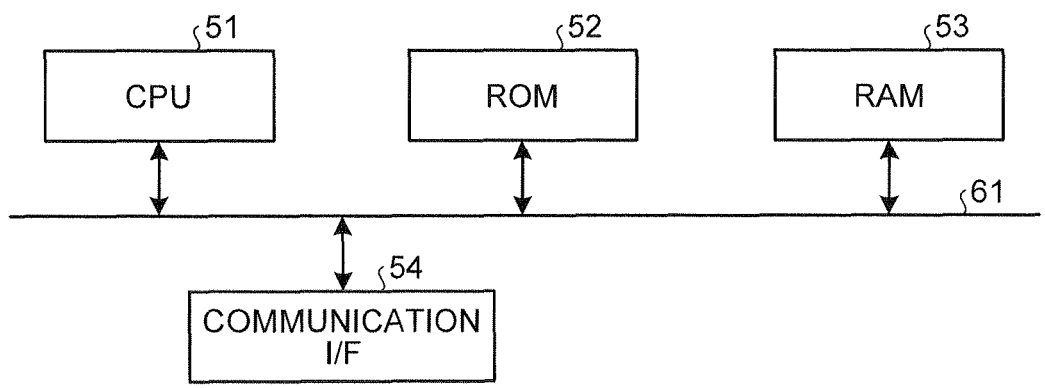
FIG. 19 is a hardware configuration diagram of the object detection system according to the embodiments.

Explained below with reference to FIG. 19 is a hardware configuration of each device (the object detection device, the client device, and the server device) in the object detection system according to the embodiments described above. FIG. 19 is an explanatory diagram illustrating a hardware configuration of the object detection system according to the embodiments described above.

The object detection system according to the embodiments described above includes a control device such as a central processing unit (CPU) 51; memory devices such as a read only memory (ROM) 52 and a random access memory (RAM) 53; a communication I/F 54 that performs communication by establishing connection with a network; and a bus 61 that interconnects the constituent elements.

Meanwhile, the programs executed in the object detection system according to the embodiments described above are stored in advance in the ROM 52.

Alternatively, the programs executed in the object detection system according to the embodiments described above can be recorded in the form of installable or executable files in a computer-readable recording medium such as a compact disk read only memory (CD-ROM), a flexible disk (FD), a compact disk readable (CD-R), or a digital versatile disk (DVD).

Still alternatively, the programs executed in the object detection system according to the embodiments described above can be saved as downloadable files on a computer connected to the Internet or can be made available for distribution through a network such as the Internet.

The programs executed in the object detection system according to the embodiments described above can make a computer function as the constituent elements (the obtaining unit, the estimating unit, the setting unit, the first calculating unit, the second calculating unit, and the detecting unit) of the object detection system. In that computer, the CPU 51 can read the computer-readable programs from a memory medium and execute them after loading them in a main memory device.

According to an embodiment, it becomes possible to provide an object detection system and a computer program product that enable object detection which is robust against the changes in the environment in which images are captured.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An object detection system comprising:
one or more hardware processors programmed to:
obtain an image in which an object is captured by an imaging unit;
estimate a condition which influences a feature value of the image;
set, in the image, a sampling point and areas around the sampling point that have at least one of a relative positional relationship altered according to the condition and a shape altered according to the condition;
calculate the feature value of an image portion covering each area, the feature value comprising statistics of brightness gradients; and
compare the calculated feature value with a feature value of a predetermined registered object, and detect the registered object corresponding to the object, wherein
the areas are disposed in point symmetric directions with the sampling point, and the relative relationship and the shape of the areas are altered so that the relative relationship of the object with respect to the imaging unit matches with the relative relationship of the areas with respect to an entire image, and
the one or more hardware processors are further programmed to
calculate the brightness gradient at the sampling point using brightness values of the areas, each of which includes a plurality of pixels.

2. The system according to claim 1, wherein the one or more hardware processors are programmed to alter a method of calculating the statistics according to the condition.

3. The system according to claim 1, wherein the one or more hardware processors are further programmed to calculate color feature values of the areas, and calculate the feature value that comprises the statistics of the calculated brightness gradients and the calculated color feature values.

4. The system according to claim 1, wherein, according to the condition, the one or more hardware processors are further programmed to alter the relative positional relationship of sampling points that serve as the reference for setting the areas.

5. The system according to claim 1, wherein the system includes a client device and a server device,
the client device including one or more of the hardware processors programmed to obtain, estimate, set and calculate; and
the server device including one or more of the hardware processors programmed to detect, wherein
the one or more hardware processors of the client device are further programmed to send the feature value, which is calculated, to the server device, and
the one or more hardware processors of the server device are further programmed to compare the feature value sent by the client device with feature values of registered objects and detect the registered object corresponding to the object.

6. The system according to claim 1, wherein the system includes a client device and a server device,
the client device including one or more of the hardware processors programmed to obtain; and
the server device including one or more of the hardware processors programmed to estimate, set, calculate and detect, wherein
the one or more hardware processors of the client device are further programmed to send the image, which is obtained, to the server device, and
the one or more hardware processors of the server device are further programmed to, in the image sent by the client device, set the areas that have at least one of the relative positional relationship altered according to the condition and the shape altered according to the condition.

7. A computer program product comprising at least one non-transitory computer-readable medium containing one or more programs which, when executed by one or more computers, causes the computers to execute at least:
obtaining an image in which an object is captured by an imaging unit;
estimating a condition which influences a feature value of the image;
setting, in the image, a sampling point and areas around the sampling point that have at least one of a relative positional relationship altered according to the condition and a shape altered according to the condition;
calculating the feature value of an image portion covering each area, the feature value comprising statistics of brightness gradients;

comparing the calculated feature value with a feature value of a predetermined registered object; and detecting the registered object corresponding to the object, wherein the areas are disposed in point symmetric directions with the sampling point, and the relative relationship and the shape of the areas are altered so that the relative relationship of the object with respect to the imaging unit matches with the relative relationship of the areas with respect to an entire image, and the calculating includes calculating the brightness gradient at the sampling point using brightness values of the areas, each of which includes a plurality of pixels.

8. The computer program product according to claim 7, wherein the programs cause the computers to further execute altering a method of calculating the statistics according to the condition.

9. The computer program product according to claim 7, wherein the programs cause the computers to further execute calculating color feature values of the areas, and calculating the feature value that comprises the statistics of the calculated brightness gradients and the calculated color feature values.

10. The computer program product according to claim 7, wherein the programs cause the computers to further execute, according to the condition, altering the relative positional relationship of sampling points that serve as the reference for setting the areas.

11. The computer program product according to claim 7, wherein the programs include a client device program and a server device program, the client device program causing a computer of a client device to execute the obtaining, the estimating, the setting and the calculating and the server device program causing a computer of a server device to execute the detecting, wherein the client device program causes the computer of the client device to further execute sending the feature value, which is calculated, to the server device, and the server device program causes the computer of the server device to further execute comparing the feature value sent by the client device with feature values of registered objects and detecting the registered object corresponding to the object.

12. The computer program product according to claim 7, wherein the programs include a client device program and a server device program, the client device program causing a computer of a client device to execute the obtaining and the server device program causing a computer of a server device to execute the detecting the estimating, the setting, the calculating and the detecting, wherein the client device program causes the computer of the client device to further execute sending the image, which is obtained, to the server device, and the server device program causes the computer of the server device to further execute, in the image sent by the client device, setting areas that have at least one of the relative positional relationship altered according to the condition and the shape altered according to the condition.

13. An object detection method employed in an object detection system comprising:

obtaining an image in which an object is captured by an imaging unit;

estimating a condition which influences a feature value of the image;

setting, in the image, a sampling point and areas around the sampling point that have at least one of a relative positional relationship altered according to the condition and a shape altered according to the condition;

calculating the feature value of an image portion covering each area, the feature value comprising statistics of brightness gradients;

comparing the calculated feature value with a feature value of a predetermined registered object; and detecting the registered object corresponding to the object, wherein the areas are disposed in point symmetric directions with the sampling point, and the relative relationship and the shape of the areas are altered so that the relative relationship of the object with respect to the imaging unit matches with the relative relationship of the areas with respect to an entire image, and the calculating includes calculating the brightness gradient at the sampling point using brightness values of the areas, each of which includes a plurality of pixels.

14. The object detection method according to claim 13, further comprising: altering a method of calculating the statistics according to the condition.

15. The object detection method according to claim 13, further comprising: calculating color feature values of the areas, and calculating the feature value that comprises the statistics of the calculated brightness gradients and the calculated color feature values.

16. The object detection method according to claim 13, further comprising: altering, according to the condition, the relative positional relationship of sampling points that serve as the reference for setting the areas.

17. The object detection method according to claim 13, wherein the method is employed in a client device and a server device, the client device performing the obtaining, the estimating, the setting and the calculating and the server device performing the detecting, wherein the method employed in the client device further comprises sending the feature value, which is calculated, to the server device, and the method employed in the server device further comprises comparing the feature value sent by the client device with feature values of registered objects and detecting the registered object corresponding to the object.

18. The object detection method according to claim 13, wherein the method is employed in a client device and a server device, the client device performing the obtaining and the server device performing the estimating, the setting, the calculating and the detecting, wherein the method employed in a client device further comprises sending the image, which is obtained, to the server device, and the method employed in the server device further comprises, in the image sent by the client device, setting areas that have at least one of the relative positional relationship altered according to the condition and the shape altered according to the condition.

* * * * *